(12) United States Patent
So et al.

(10) Patent No.: US 7,630,708 B2
(45) Date of Patent: Dec. 8, 2009

(54) TESTER FOR DETERMINING THE VALIDITY OF A FEATURE IN A REMOTE DEVICE

(75) Inventors: Albert So, San Jose, CA (US); Yingqing Lawrence Cui, San Jose, CA (US); Min Zhou, Palo Alto, CA (US); Zhaowei Charlie Jiang, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 119 days.

(21) Appl. No.: 11/077,921

(22) Filed: Mar. 11, 2005

(65) Prior Publication Data
US 2006/0205397 A1 Sep. 14, 2006

(51) Int. Cl.
*H04W 24/00* (2009.01)
(52) U.S. Cl. .................. 455/425; 455/67.11
(58) Field of Classification Search ............. 455/425, 455/423, 67.11; 379/21; 714/32, 33, 36, 714/25, 1
See application file for complete search history.

(56) References Cited

U.S. PATENT DOCUMENTS

| | | | |
|---|---|---|---|
| 5,511,108 A * | 4/1996 | Severt et al. .................. 379/21 |
| 5,675,748 A * | 10/1997 | Ross .......................... 710/104 |
| 5,758,088 A | 5/1998 | Bezaire et al. |
| 6,021,433 A | 2/2000 | Payne et al. |
| 6,167,426 A | 12/2000 | Payne et al. |
| 6,178,524 B1 * | 1/2001 | Taylor ......................... 714/36 |
| 6,205,581 B1 * | 3/2001 | Kang .......................... 717/173 |
| 6,260,045 B1 * | 7/2001 | Eidt ....................... 707/103 R |
| 6,515,484 B1 * | 2/2003 | Bald et al. ................... 324/551 |
| 6,643,798 B2 * | 11/2003 | Barton et al. ................. 714/25 |
| 6,735,614 B1 | 5/2004 | Payne et al. |
| 7,117,112 B2 * | 10/2006 | Mok ........................... 702/117 |
| 2004/0048608 A1 * | 3/2004 | Matsuo et al. ............... 455/418 |
| 2004/0058652 A1 * | 3/2004 | McGregor et al. ........ 455/67.13 |
| 2004/0102187 A1 * | 5/2004 | Moller et al. ................ 455/418 |

(Continued)

OTHER PUBLICATIONS

*The SysInfo MIDlet*. J2ME Device (Issue) Database. (accessed Dec. 23, 2004) <http://kissen.cs.uni-dortmund.de:8080/devicedb/sysinfo.html>.

(Continued)

*Primary Examiner*—George Eng
*Assistant Examiner*—Christopher M Brandt
(74) *Attorney, Agent, or Firm*—Darby & Darby P.C.; Scott M. Tobias

(57) ABSTRACT

One or more test classes implement an object oriented interface that specifies an execution method and a results method called from a user interface running on the mobile terminal or an emulator. The user interface enables a user to select one or more tests to run, view results, and upload results to a server. For each test, the user interface calls the execution method to initiate the test and obtain a success or failure indication. The user interface also calls the results method to obtain data on a capability and/or to obtain validation that the capability is complete and reliable. Tests that require specific hardware are activated or deactivated, depending on whether the mobile terminal includes the required hardware. Test include a memory size test, a memory integrity test, a socket connection test, an HTTP test, a camera test, an image rendering speed test, a message test, and the like.

30 Claims, 10 Drawing Sheets

U.S. PATENT DOCUMENTS

| | | | |
|---|---|---|---|
| 2004/0153788 A1* | 8/2004 | Krietemeyer et al. | 714/25 |
| 2004/0168106 A1* | 8/2004 | Cherny et al. | 714/32 |
| 2004/0214559 A1* | 10/2004 | Date et al. | 455/418 |
| 2004/0243338 A1* | 12/2004 | Sabiers et al. | 702/122 |
| 2005/0064865 A1* | 3/2005 | Goldberg | 455/425 |
| 2005/0090245 A1* | 4/2005 | Kim | 455/425 |
| 2005/0204343 A1* | 9/2005 | Kisamore et al. | 717/124 |
| 2005/0231595 A1* | 10/2005 | Wang et al. | 348/187 |
| 2006/0064269 A1* | 3/2006 | Mok | 702/118 |
| 2006/0073785 A1* | 4/2006 | Klassen et al. | 455/3.01 |
| 2006/0107145 A1* | 5/2006 | Athavale et al. | 714/727 |
| 2006/0168491 A1* | 7/2006 | Lee et al. | 714/733 |
| 2006/0183470 A1* | 8/2006 | Koivukangas et al. | 455/423 |

OTHER PUBLICATIONS

*JBenchmark mobile java (J2ME) performance tools*. JBenchmark. (accessed Dec. 23, 2004) <http://www.jbenchmark.com/index.html?F=TOOLS>.

Davis, Malcolm "Incremental Development with Ant and JUnit," IBM, Nov. 1, 2000, 12 pgs.

Clark, Mike, "JUnit Primer," Clarkware Consulting, Oct. 7, 2000, 10 pgs.

* cited by examiner

TESTER FOR DETERMINING THE VALIDITY OF A FEATURE IN A REMOTE DEVICE

FIELD OF THE INVENTION

The present invention is directed to testing a mobile terminal, and more specifically to determining and validating capabilities of the mobile terminal.

BACKGROUND OF THE INVENTION

Cell phones, personal digital assistants (PDAs), and other mobile terminals often include a hardware and software platform that is based on an industry standard. For example, many mobile terminal manufacturers utilize the Java™ 2 micro edition (J2ME) specification, provided by Sun Microsystems, Inc., so that differing cell phones can run the same application program. Details on the J2ME specification can be found from Sun Microsystems, Inc. (e.g., http://jcp.org/aboutJava/communityprocess/final/jsr037/index.html).

However, the specification may not be perfectly clear, and/or some mobile terminals may not strictly comply with the specification. Thus, some mobile terminals do not run application programs as expected and/or perform in unexpected ways. Unexpected characteristics of some mobile terminals are often not provided in documentation and may only be discovered after substantial time and effort has been expended in developing an application program.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings wherein.

DETAILED DESCRIPTION OF THE INVENTION

The present invention now will be described more fully hereinafter with reference to the accompanying drawings, which form a part hereof, and which show, by way of illustration, specific exemplary embodiments by which the invention may be practiced. This invention may, however, may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

An embodiment is described in terms of a mobile terminal that has an ability to interface with one or more networks, optionally including multiple types of networks. This exemplary embodiment is designed to enable testing of the mobile terminal to validate its capabilities, and/or determine the extent of its capabilities. The following embodiment relates to testing mobile terminals that include a J2ME application environment. However, the invention can be adapted to other environments.

Figure 1:
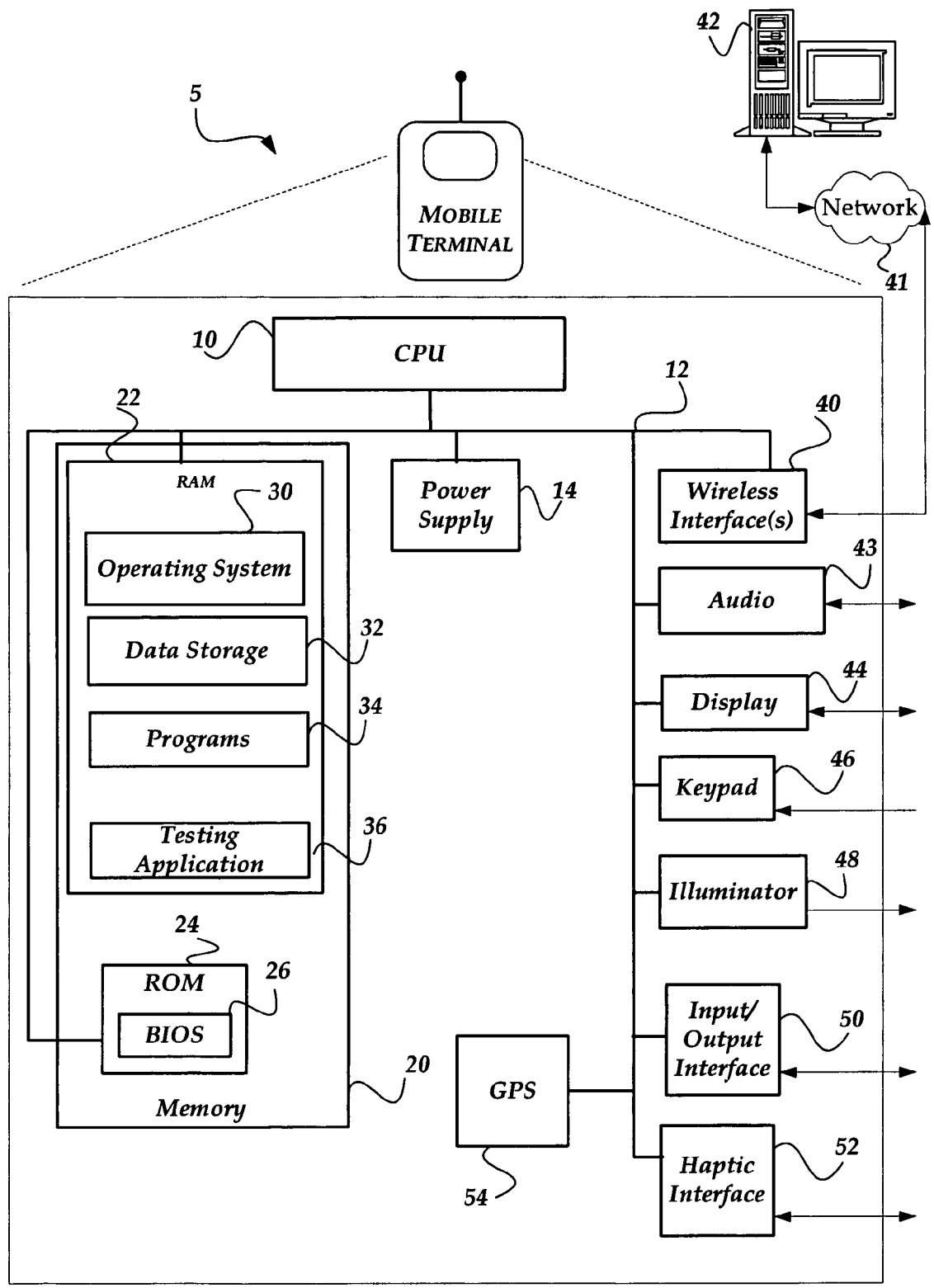
FIG. 1 shows an exemplary mobile terminal, according to one embodiment of the invention.

FIG. 1 shows an exemplary mobile terminal 5, according to one embodiment of the invention. In one embodiment, mobile terminal 5 is a cellular telephone that is arranged to send and receive voice communications and messages such as Short Messaging Service (SMS) messages via one or more wireless communication interfaces. Generally, mobile terminal 5 may comprise any personally mobile electronic device. Oftentimes, mobile electronic devices will be capable of personal communication by connecting to one or more wireless networks, connecting to multiple nodes of a single wireless network, communicating over one or more channels to one or more networks, or otherwise engaging in one or more communication sessions. Such devices include cellular telephones, smart phones, pagers, radio frequency (RF) devices, infrared (IR) devices, integrated devices combining one or more of the preceding devices, and the like. Mobile terminal 5 may also comprise other electronic devices that such as Personal Digital Assistants (PDAs), handheld computers, personal computers, multiprocessor systems, microprocessor-based or programmable consumer electronics, network PCs, wearable computers, and the like.

Mobile terminal 5 may include many more components than those shown in FIG. 1. However, the components shown are sufficient to disclose an illustrative embodiment for practicing the present invention. As shown in the figure, mobile terminal 5 includes a processing unit 10 in communication with a mass memory 20 via a bus 12.

Mass memory 20 includes a RAM 22, a ROM 24, and other storage means. Mass memory 20 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 20 stores a basic input/output system ("BIOS") 26 for controlling low-level operation of mobile terminal 5. The mass memory also stores an operating system 30 for controlling the operation of mobile terminal 5. It will be appreciated that this component may include a general purpose operating system such as a version of UNIX or LINUX™, or a specialized mobile communication operating system such as the Symbian® operating system. The operating system may include, or interface with a Java™ virtual machine module that enables control of hardware components and/or operating system operations via Java™ application programs.

Memory 20 further includes one or more data storage units 32, which can be utilized by mobile terminal 5 to store, among other things, programs 34, databases and/or other data. Programs 34 may include computer executable instructions which, when executed by mobile terminal 5, transmit and receive WWW pages, e-mail, audio, video, and enable telecommunication with another user of another mobile device. In addition, mass memory 30 stores testing application 36, which may be stand-alone or work in conjunction with an application on a remote device such as a server. Testing application 36 may include computer executable instructions, which may be run under control of operating system 30 to test and validate capabilities and features of mobile terminal 5.

Mobile terminal 5 also includes a power supply 14, one or more wireless interfaces 40, an audio interface 42, a display 44, a keypad 46, an illuminator 48, an input/output interface 50, a haptic interface 52, and an optional global positioning systems (GPS) receiver 54. Power supply 14 provides power to mobile terminal 5. A rechargeable or non-rechatgeable battery may be used to provide power. The power may also be provided by an external power source, such as an AC adapter or a powered docking cradle that supplements and/or recharges a battery.

Mobile terminal 5 may optionally communicate with a base station (not shown), or directly with another mobile device. Wireless interface 40 enables mobile terminal 5 to communicate through a wireless network 41, to a wired telecommunications network, to a computer network, and/or to other networks coupled to remote devices such as a server 42, another mobile terminal, a wired telecommunications device, and the like. Wireless interface 40 includes circuitry for coupling mobile terminal 5 to one or more wireless networks, and is constructed for use with one or more communication protocols and technologies including, but not limited to, global system for mobile communication (GSM), code division multiple access (CDMA), time division multiple access (TDMA), user datagram protocol (UDP), transmission control protocol/internet protocol (TCP/IP), SMS, general packet radio service (GPRS), Wireless Application Protocol (WAP), ultra wide band (UWB), IEEE 802.16 Worldwide Interoperability for Microwave Access (WiMax), and the like.

Audio interface 43 is arranged to produce and receive audio signals such as the sound of a human voice. For example, audio interface 54 may be coupled to a speaker and microphone (not shown) to enable telecommunication with others and/or generate an audio acknowledgement for some action. Display 44 may be a liquid crystal display (LCD), gas plasma, light emitting diode (LED), or any other type of display used with a mobile device. Display 44 may also include a touch sensitive screen arranged to receive input from an object such as a stylus or a digit from a human hand.

Keypad 46 may comprise any input device arranged to receive input from a user. For example, keypad 58 may include a push button numeric dial, or a keyboard. Keypad 46 may also include command buttons that are associated with selecting and sending images. Illuminator 48 may provide a status indication and/or provide light. Illuminator 48 may remain active for specific periods of time or in response to events. For example, when illuminator 48 is active, it may backlight the buttons on keypad 46 and stay on while the mobile device is powered. Also, illuminator 48 may backlight these buttons in various patterns when particular actions are performed, such as dialing another mobile device. Illuminator 48 may also cause light sources positioned within a transparent or translucent case of the mobile device to illuminate in response to actions.

Mobile terminal 5 also comprises input/output interface 50 for communicating with external devices, such as a headset, or other input or output devices not shown in FIG. 1. Input/output interface 50 can utilize one or more communication technologies, such as USB, infrared, Bluetooth™, and the like. Haptic interface 52 is arranged to provide tactile feedback to a user of the mobile terminal. For example, the haptic interface may be employed to vibrate mobile terminal 5 in a particular way when another user of a mobile device is calling.

Optional GPS transceiver 54 can determine the physical coordinates of mobile terminal 5 on the surface of the Earth, which typically output a location as latitude and longitude values. GPS transceiver 54 can also employ other geo-positioning mechanisms, including, but not limited to, triangulation, assisted GPS (AGPS), E-OTD, CI, SAI, ETA, BSS and the like, to further determine the physical location of mobile terminal 5 on the surface of the Earth. It is understood that under different conditions, GPS receiver 62 can determine a physical location within millimeters for mobile terminal 5; and in other cases, the determined physical location may be less precise, such as within a meter or significantly greater distances.

Screen Shots

Figure 2:
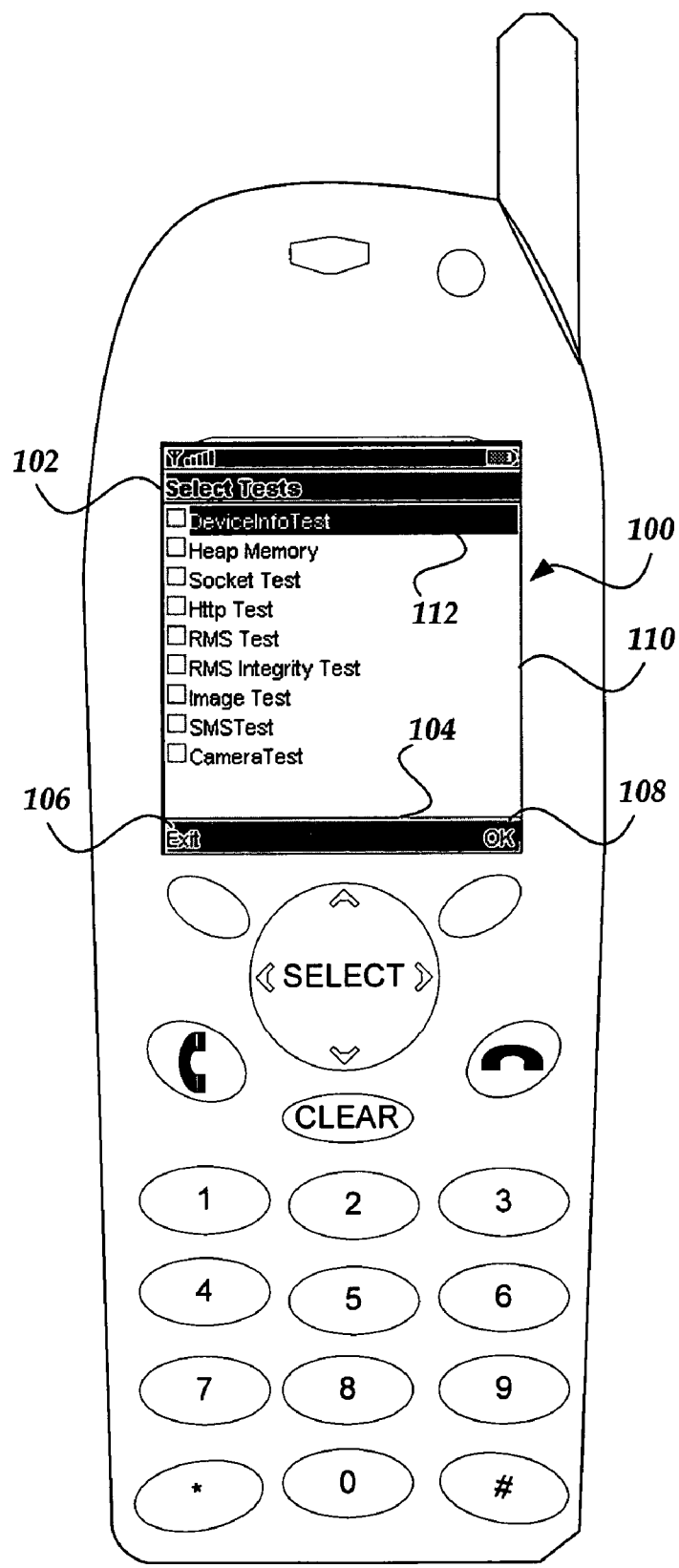
FIG. 2 illustrates a tester user interface that enables a user to select one or more tests to determine and/or validate the capabilities and features of a mobile terminal.

FIG. 2 illustrates a tester user interface 100 that enables a user to select one or more tests to determine and/or validate the capabilities and features of a mobile terminal. Tester user interface 100 includes a title area 102 indicating that the user can select from a list of tests. A menu area 104 provides options for the user to interact with the tester user interface. For example, an exit option 106 enables the user to terminate the tester user interface. An OK option 108 enables the user to begin execution of selected tests. The user may directly interact with the menu options if the display supports touch screen capability, or the user may use keypad buttons to select menu options. Similarly, the user may press keypad buttons or touch portions of a primary display area 110 to navigate to, and/or select tests to execute. A highlight rectangle 112 indicates a current location and/or selection.

As illustrated, the currently highlighted test is a device information test that accesses stored specifications about the mobile terminal, such as a screen width and height, a color capability for the screen, default location and languages settings, the version of a J2ME connected limited device configuration (CLDC) application programming interface (API) that is installed in the mobile terminal, and/or other data. Other tests include, but are not limited to:

a heap memory test for determining an available and usable amount of heap memory in the mobile terminal;

a socket test for validating that a socket connection to a server can be opened from the mobile terminal;

an HTTP test for ensuring that the mobile device can access one or more web pages multiple times without causing an error in the mobile terminal;

a record management system (RMS) test for determining a true quantity of persistent memory available for use by application programs;

an RMS integrity test for validating that data stored in the RMS persistent memory does not get overwritten or corrupted and can be read back correctly;

an image test for determining a speed at which the mobile device can render graphic images;

a short message service (SMS) test for validating communication of SMS messages; and a camera test for validating control and operation of a camera built into the mobile device.

Figure 3:
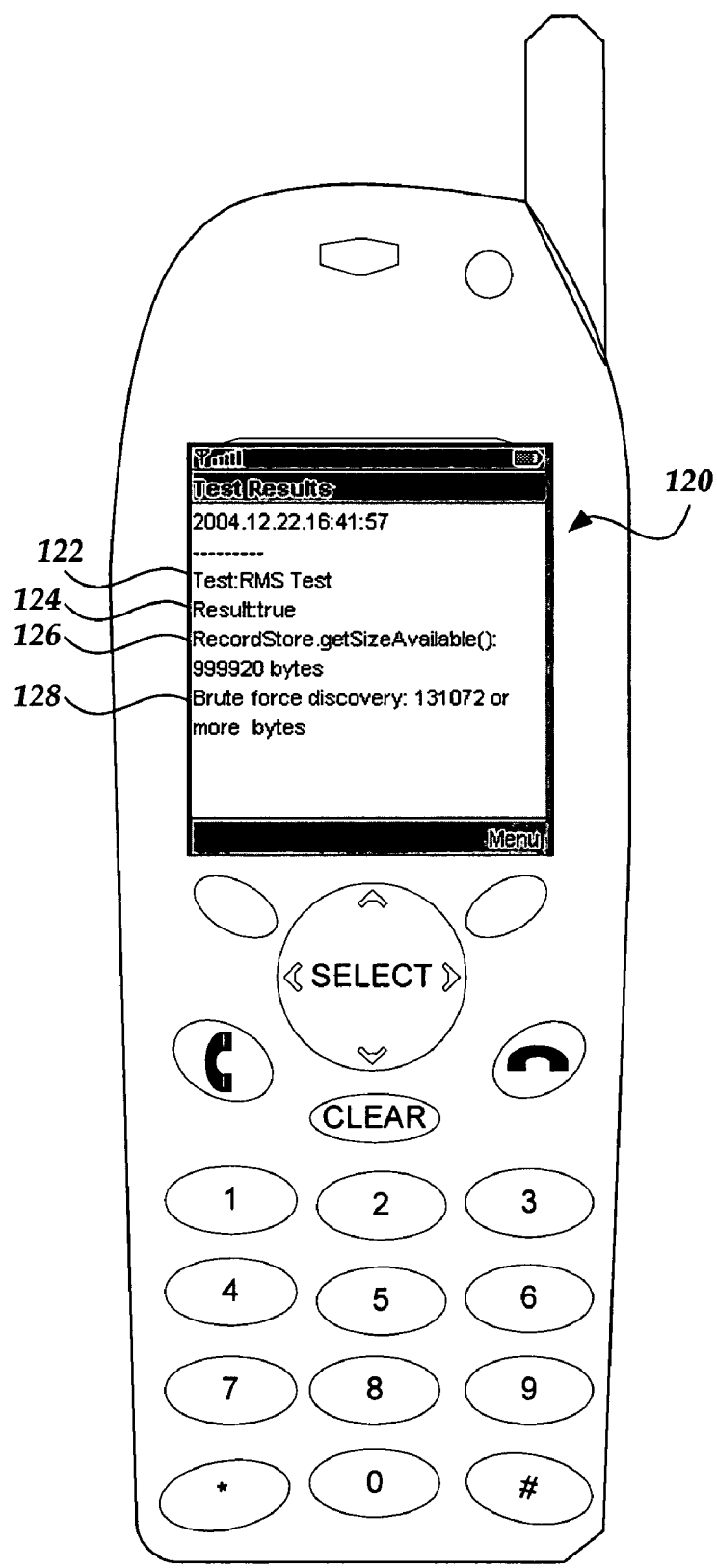
FIG. 3 illustrates a results display after execution of a memory size test.

FIG. 3 illustrates a results display 120 after execution of one of the tests. In particular, a test name 122 indicates that the RMS test was executed on the mobile device. A test success indication 124 specifies whether the test executed completely and/or whether the results of the test met one or more predefined criteria. In this case, the RMS test executed completely, and there were not necessarily any predefined criteria. Instead, this test provides one or more detailed test results indicating memory capacities. Specifically, a first detailed test result 126 indicates that approximately one megabyte of persistent memory is available according to internal specifications stored in the mobile terminal. However, a second detailed test result 128 indicates that a series of memory requests found that only approximately 131 kilobytes or persistent memory were confirmed to be available, but additional persistent memory may be available.

Figure 4:
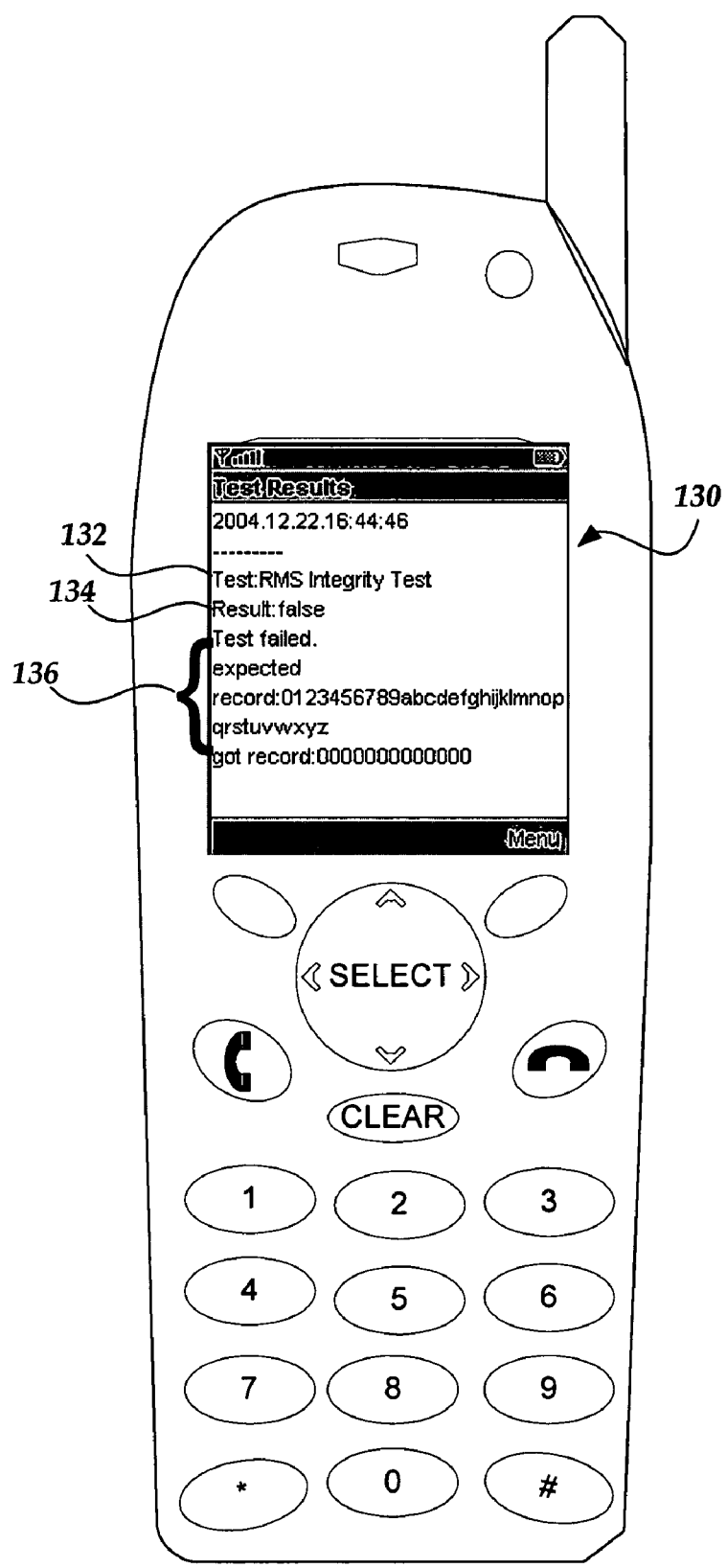
FIG. 4 illustrates a results display after execution of memory integrity test.

FIG. 4 illustrates a results display 130 after execution of another test. In particular, a test name 132 indicates that the RMS integrity test was executed on the mobile device. A test success indication 134 shows a false result, which indicates that the test failed. A detailed test result 136 explains that the test failed, because a known record of data, which was written to the persistent memory by the test, was not correctly retrieved from the persistent memory. This suggests that the mobile terminal may incorrectly write or overwrite a portion of the persistent memory, which may cause undesired results with an application program.

Creating and Executing Tests

Figure 5:
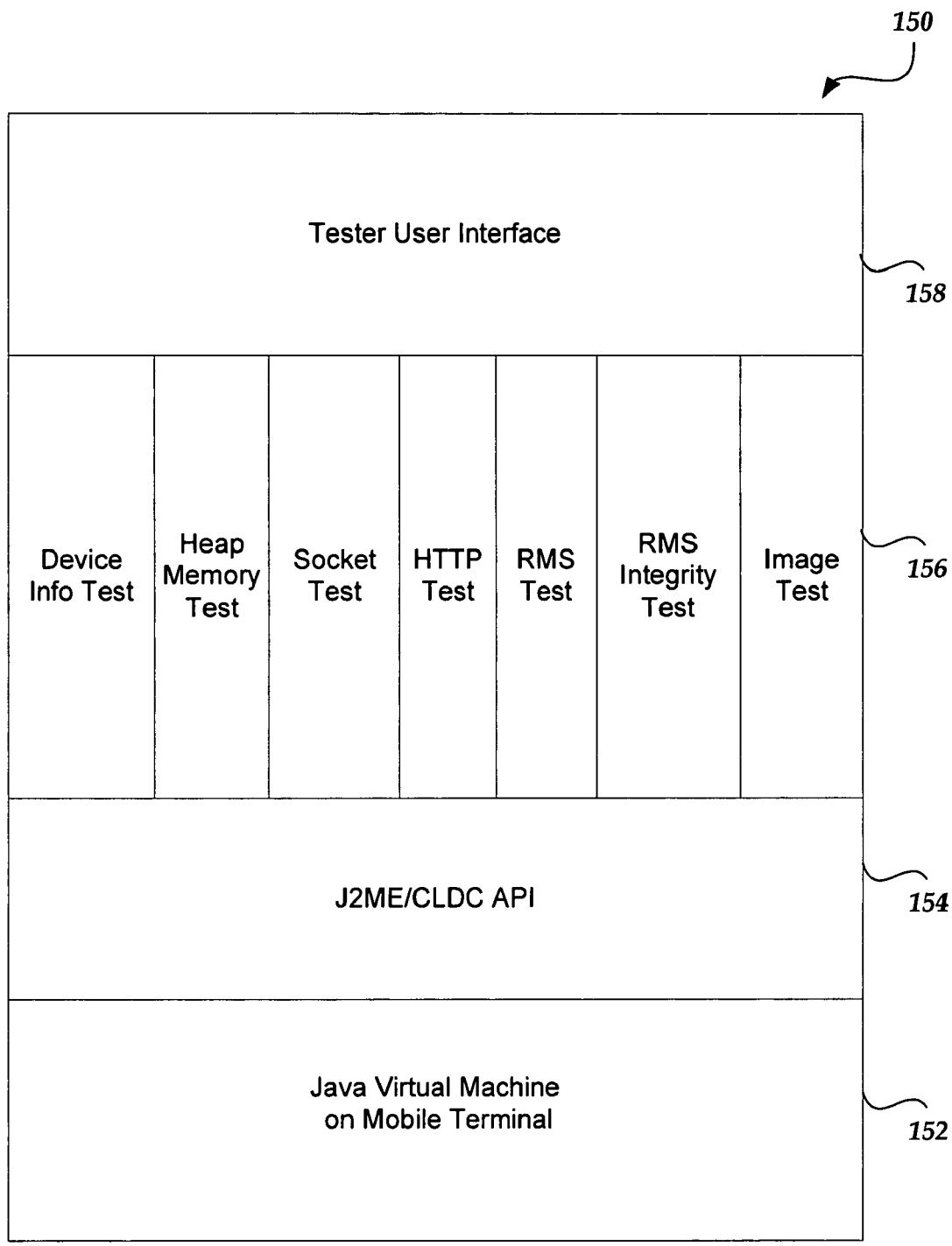
FIG. 5 is a block diagram illustrating a software architecture of one embodiment of the present invention.

FIG. 5 is a block diagram illustrating a software architecture 150 of one embodiment of the present invention. A Java™ virtual machine 152 provides a base for the architecture and supports a J2ME/CLDC API 154. A set of test classes 156, such as those described above, utilize J2ME/CLDC API 154 to perform testing operations. Each of the test classes implement a Java™ interface with methods that provide data for display by a tester user interface 158. The tester user interface enables a user to select tests, and controls overall execution of the test classes. The above elements can be implemented on a physical mobile terminal or on another computing device that runs an emulation of the physical mobile terminal.

Figure 6:
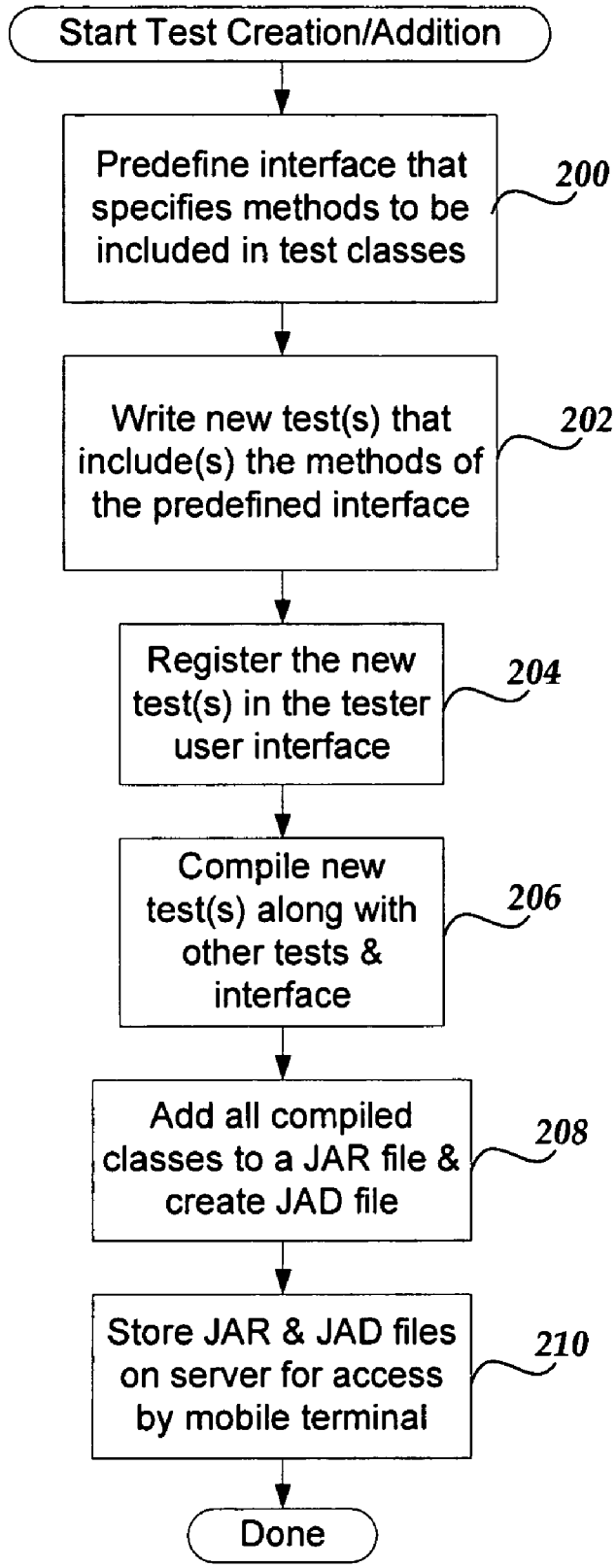
FIG. 6 is a flow diagram illustrating logic for creating and/or adding one or more tests to the set of test classes that can be run by a mobile terminal.

FIG. 6 is a flow diagram illustrating logic for creating and/or adding one or more tests to the set of test classes that can be run by a mobile terminal. At an operation 200, a developer predefines the Java™ interface to specify methods that are to be included in each test class. Any test class can be added to the set as long as the test class implements the Java™ interface (e.g., includes the methods specified by the interface). In one embodiment, the Java™ interface specifies, but is not limited to the following methods:

runTest—a boolean method that is called by the tester user interface to initiate a test class and return a value of true upon successful completion of the test or returns a value of false upon failure of the test;

getDetailResults—a string method that returns detailed results data in string form for display by the tester user interface;

getResults—a hash table method that returns test results in a tabulated form with string keys representing subtest names, and string elements representing results of each subtest, which can be used for uploading the results to a server;

getName—a string method that returns the name of a test class for display by the tester user interface to allow a user to select which tests to run;

getDescription—a string method that returns a description of a test for display by the tester user interface.

The developer includes the above methods in any new test class(es), at an operation 202. In a Java™ embodiment, each test class implements the predefined interface by declaring all of the above method names and defining corresponding method bodies that are relevant to each particular test class. A method body can define any new operations for testing a mobile device, but the method name will be that specified by the Java™ interface. The same method name will be called by the tester user interface to initiate execution of the corresponding method body in each test class. Consequently, the Java™ interface enables any new test class to be added to the set of tests, and accessed easily by the tester user interface. Code for a sample test class that implements the Java™ interface is provided below. The sample test class simply returns text strings for a successful result.

```
public class AlwaysSucceedsTest implements
com.company.devicetests.JavaInterface
{
    private m_bSuccess = false;
    public String getDescription( )
    {
        return "This test always succeeds";
    }
    public String getDetailedResults( )
    {
        return "The test succeeded = " + m_bSuccess;
    }
    public String getName( )
    {
        return "AlwaysSucceedsTest";
    }
    public boolean runTest( )
    {
        m_bSuccess = true;
    }
    public Hashtable getResults( )
    {
        Hashtable ht = new Hashtable( );
        ht.put("result", String.valueOf(m_bSuccess));
        return ht;
    }
}
```

For the tester user interface to initiate the methods of a test class, the test class must be registered with the tester user interface, as illustrated by operation 204. In the Java™ embodiment, the developer adds code to the tester user interface to declare each test class. When executed, the tester user interface will loop through each declared test class, calling the methods specified by the Java™ interface.

At an operation 206, the developer compiles all of the desired test classes along with the tester user interface. The developer can then add the compiled files to a Java™ archive (JAR) and create a Java™ application descriptor (JAD) at an operation 208. The JAR and JAD files can be stored on a server, at an operation 210, for access by mobile terminals.

Figure 7:
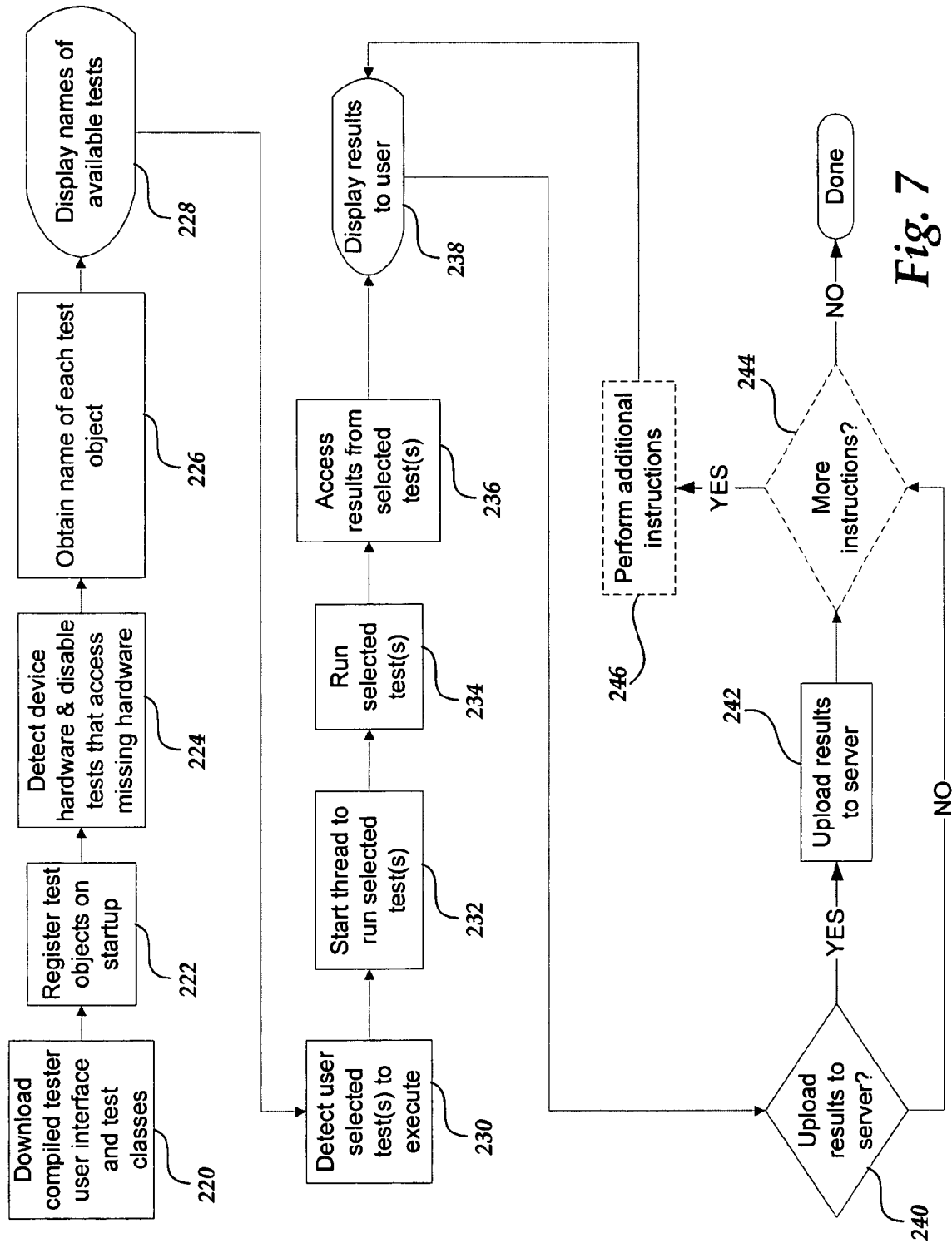
FIG. 7 is a flow diagram illustrating logic for executing tests on a mobile terminal.

FIG. 7 is a flow diagram illustrating logic for executing tests on a mobile terminal. At an operation 220, the mobile terminal downloads the JAR and JAD files and decompress them as needed. On startup of the tester user interface at an operation 222, the mobile terminal instantiates a test object for each of the test classes. At an operation 224, the tester user interface can access information about the mobile device or perform a preliminary check to detect device hardware. For example, the tester user interface can determine whether the mobile terminal includes a camera. The tester user interface can then discard or deactivate test objects that require certain hardware or other capabilities in the mobile device. This preliminary check can be performed before instantiating the test objects to prevent unnecessary test objects from being instantiated. In either case, the tester user interface obtains the name from each test object at an operation 226. In the Java™ embodiment, the tester user interface calls the getName method for each test object to get the name value defined in each test object. The tester user interface can also call the getDescription method from each test object to get a description of the corresponding tests. At an operation 228, the tester user interface displays the name of each available test, which corresponds to each test object. The tester user interface may also display the description with each test name, or display the description only after a user action, such as moving a highlight rectangle over a test name.

At an operation 230, the tester user interface detects which displayed tests are selected by a user. The user may mark each selected test and then press an OK button to indicate the user's selections. Alternatively, the user can select and execute a single test at a time. The tester user interface starts a thread to run, at an operation 232 to execute the selected test(s). At an operation 234, the tester user interface loops through execution of each test. In the Java™ embodiment, the tester user interface calls the runTest method for each selected test object. Each test object executes its corresponding test operations associated with the getResults and getDetailedResults methods. Each test object assigns a value to the identifier of each results method, and returns the value to the tester user interface at an operation 236. The tester user interface may append each test result value to a buffer for further processing or for storage before displaying the results at an operation 238.

At a decision operation 240, the tester user interface may offer the user an option to upload one or more of the test results to a server for further processing, aggregation with other results, for storage, or other purposes. Alternatively, the test or tester user interface may be programmed to automatically upload results. If the tester user interface detects an affirmative user instruction, or an automatic instruction, the tester user interface uploads the test result(s) to the server at an operation 242. The result(s) may be formatted in an extensible markup language (XML) format or other format for upload to the server. Once the upload is complete, the user chooses not to upload the result(s), or the there is no automatic upload of the result(s), the tester user interface may determine at an optional decision operation 244 whether any additional instructions have been provided by the server or the user. For example, the server may instruct the mobile terminal to execute a sub-test based on initial results received from the mobile terminal. If additional instructions are received, they are performed at an optional operation 246. The result(s) of the optional operation may be displayed to the user and/or uploaded to the server. If no more uploads are desired and no more instructions are provided, the tester user interface may terminate or await a different user instruction.

Sample Tests

Figure 8:
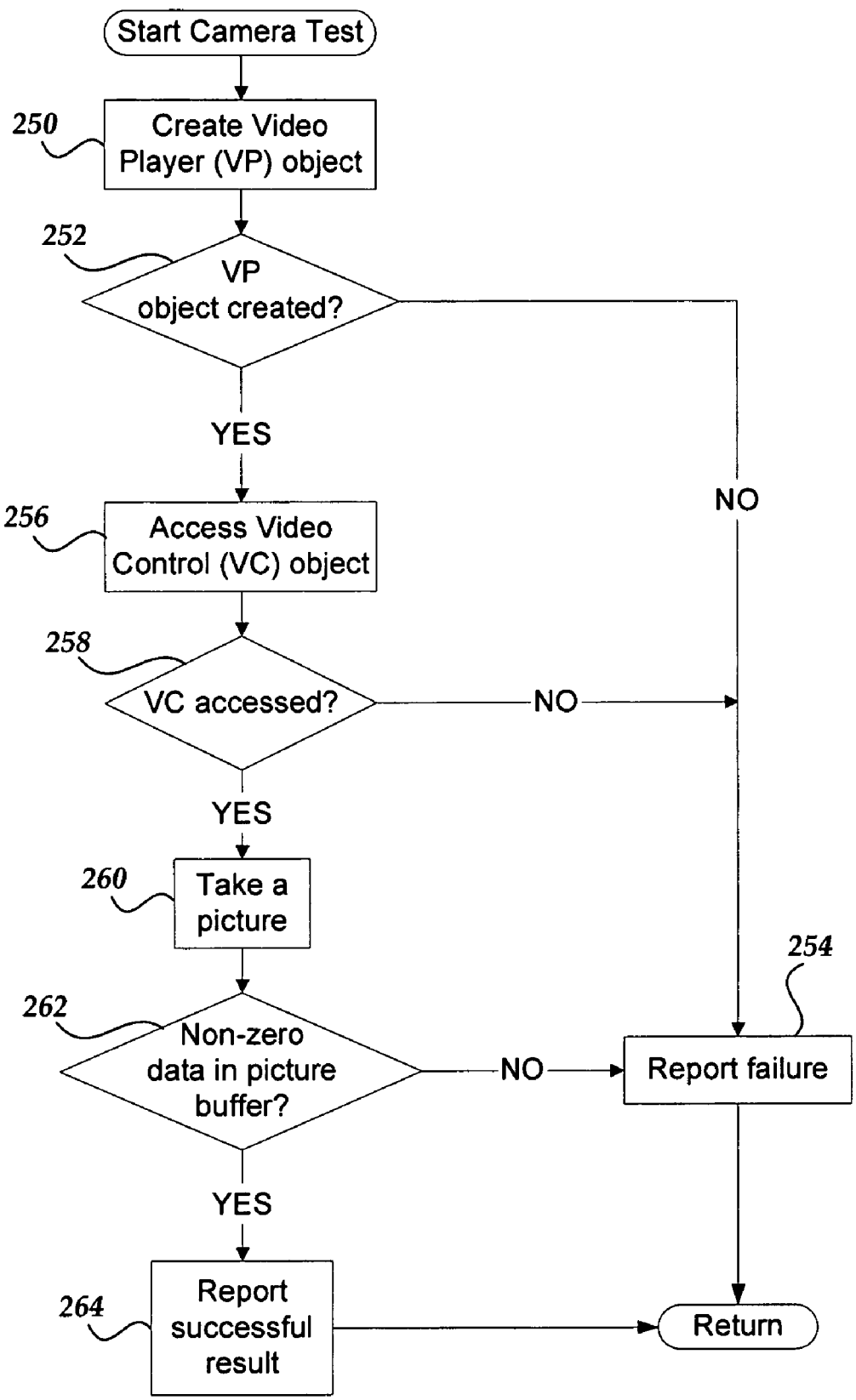
FIG. 8 is a flow diagram illustrating logic for a test class that validates functionality of a camera in a mobile terminal.

FIG. 8 is a flow diagram illustrating logic for a test class that validates functionality of a camera in a mobile terminal. At an operation 250, the camera test class instantiates a video player object, which would display what the camera currently sees. The camera test class determines at a decision operation 252 whether the video player object was instantiated correctly. If a failure is encountered, a camera may not be present on the mobile terminal or there may be an error in its operation. In that case, the camera test class reports the failure at an operation 254. If a video player object is instantiated correctly, the camera test class accesses a video control object at an operation 256. The video control object controls the camera. The camera test class determines at a decision operation 258 whether the video control object accessed correctly. If a failure is encountered the camera test class reports the failure at operation 254.

However, if no error is encountered thus far, the camera test class instructs the video control object to take a picture with the camera at an operation 260. At a decision operation 262, the camera test object determines whether a picture was taken. A picture will be represented by non-zero data in a picture buffer. If a picture was not taken, the camera test class reports a failure at operation 254. If a picture was captured, the camera test class reports a successful result at an operation 264. The result is returned to the user interface for display on the mobile terminal display.

Figure 9:
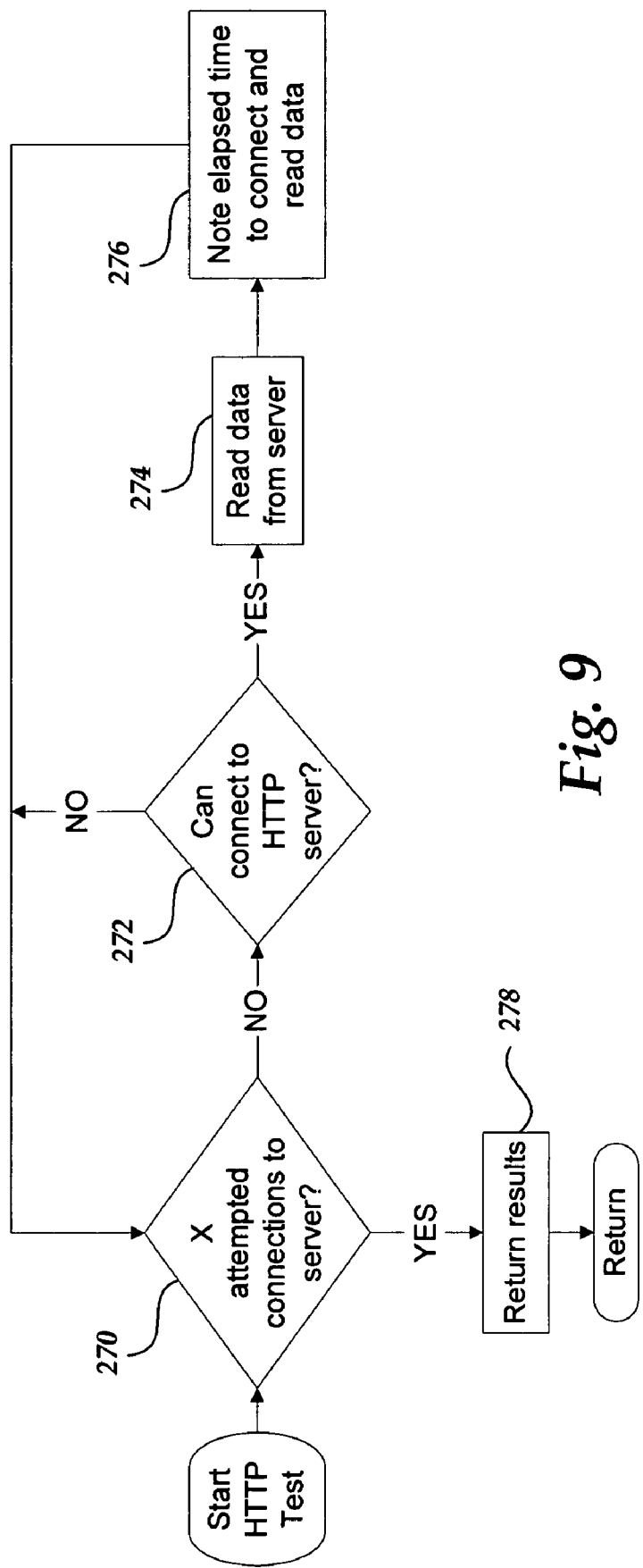
FIG. 9 is a flow diagram illustrating logic for a test class that validates HTTP communication with a mobile terminal.

FIG. 9 is a flow diagram illustrating logic for a test class that validates HTTP communication with a mobile terminal. In general, some mobile terminals can not reliably connect to remote computing devices, and may crash after a few successful connections. The HTTP test class sets a counter and then counts a sufficiently large number of attempts to access one or more web pages. More specifically, at a decision operation 270, the HTTP test class determines whether a predefined number of attempts have been made to connect to one predetermined uniform resource locator (URL), or a predetermined set of URLs. The predetermined URL may also count a number of hits from the mobile device for later comparison. If the predetermined number of attempts have not yet been made, the HTTP test class attempts to connect to a predetermined URL and determines at a decision operation 272 whether the connection was made successfully. If the connection attempt failed, a counter is updated and control is returned to decision operation 270.

However, if a successful connection is made, the HTTP test class reads data from the accessed resource at an operation 274. At an operation 276, the HTTP test class records the elapsed time to make the connection and read the data. Control then returns to decision operation 270. When the predefined number of attempts have been made, the HTTP test class returns the results to the user interface for display and/or further processing. The HTTP test class may return the number of successful connections, the number of failed connections, an average round trip time to connect and fetch data, and/or other information.

Figure 10:
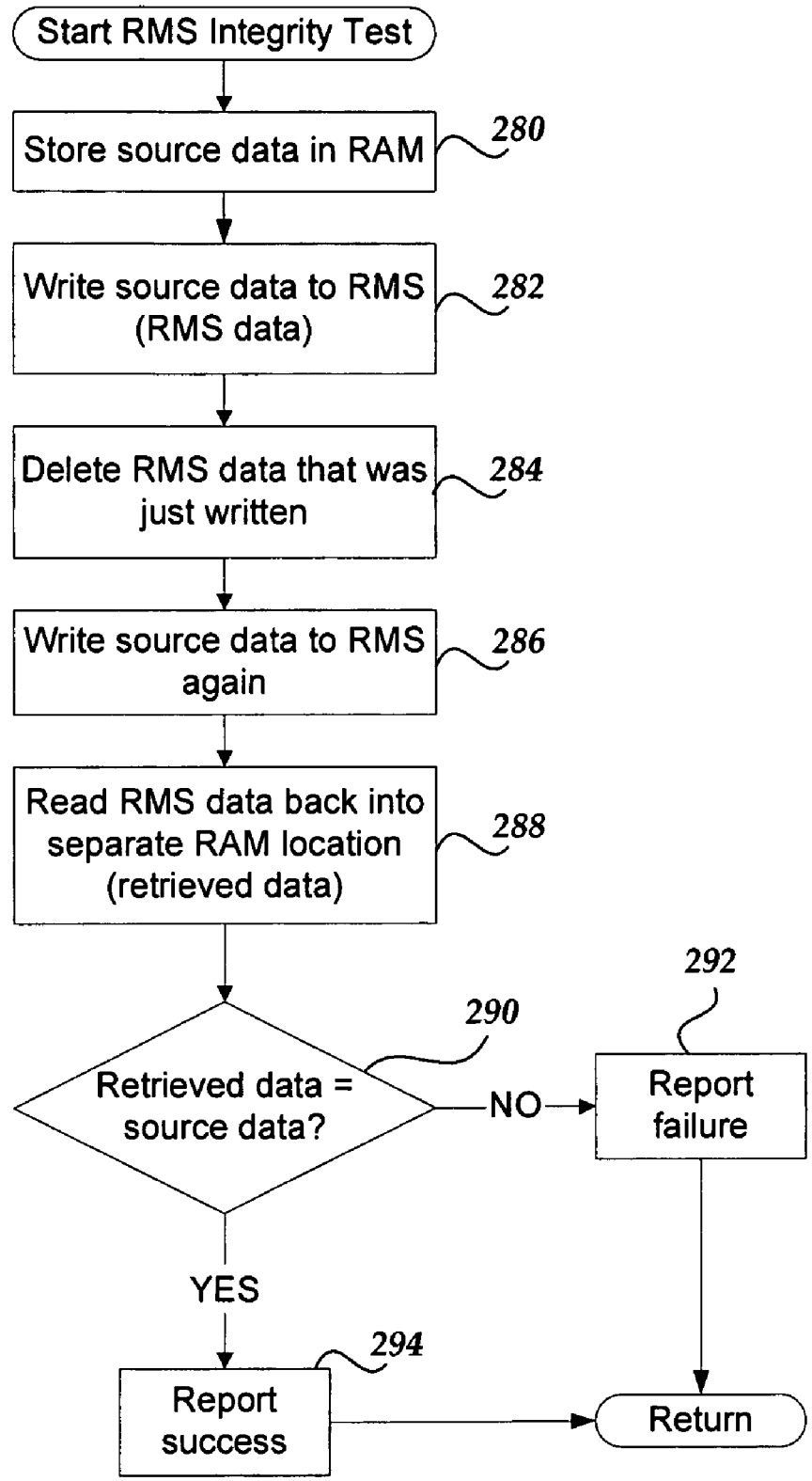
FIG. 10 is a flow diagram illustrating logic for a test class that validates the integrity of RMS memory in a mobile terminal.

FIG. 10 is a flow diagram illustrating logic for a test class that validates the integrity of RMS memory in a mobile terminal. At an operation 280, the RMS integrity test class loads predefined source data into RAM. The RMS integrity test class writes the predefined source data to RMS memory at an operation 282. The stored data will be referred to as RMS data. At an operation 284, the RMS integrity test class deletes the RMS data that was just stored. This writing and deleting process helps to ensure that residual data from prior operations are not left in the RMS memory, which may later result in an inaccurate reading of the RMS memory.

At an operation 286, the RMS integrity test class again writes the source data from RAM to the RMS memory. The stored data will again be referred to as RMS data. The RMS integrity test class then reads back the RMS data, at an operation 288, and stores the retrieved data to a separate location in RAM. At a decision operation 290, the RMS integrity test class compares the retrieved data with the source data. If the data are not the same, the RMS integrity test reports a failure to the user interface at an operation 292. Conversely, if the data are the same, the RMS integrity test reports a success to the user interface at an operation 294.

The above specification, examples and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for testing a mobile terminal, comprising:
   creating a program interface specifying at least an execution method that is called to perform at least one local test of a capability of the mobile terminal and a results method that returns a result for each performed local test;
   on the mobile terminal, implementing the program interface with a test class that can perform the at least one local test of the capability of the mobile terminal by calling the execution method and the results method;
   providing a user interface on the mobile terminal, wherein the user interface enables a user to select the at least one local test from a plurality of local tests;
   automatically performing a preliminary check of the mobile terminal to detect whether the mobile terminal includes a component to be locally tested by at least one of the plurality of local tests;
   automatically deactivating the at least one of the plurality of local tests to prevent instantiating of the at least one of the plurality of local tests if the performed preliminary check determines that the mobile terminal does not include the component to be tested by the at least one of the plurality of local tests; and
   performing the at least one local test with the test class on the mobile terminal by calling the execution method and the results method, if the instantiating of the at least one local test was not deactivated.

2. The method of claim 1, further comprising:
   causing the user interface to call the execution method and the results method for each test class from a plurality of test classes to perform the at least one local test from the plurality of local tests selected by the user.

3. The method of claim 1, wherein the component is a hardware component.

4. The method of claim 1, further comprising:
   implementing the program interface with a new test class that can perform a new local test of a different capability of the mobile terminal by calling the execution method and the results method, wherein the new local test is different from each other local test in the plurality of local tests; and
   registering the new test class with a control module that calls the execution method and the results method of the test class and the new test class.

5. The method of claim 1, wherein the program interface further specifies at least one of the following: a name method that identifies the at least one local test; and a description method that provides a description of the at least one local test.

6. The method of claim 1, wherein the results method returns at least one of a string and a table.

7. The method of claim 1, further comprising communicating the result of the at least one local test on the mobile terminal to a remote computing device.

8. The method of claim 1, further comprising:
   receiving an instruction from one of a remote computing device and a user; and
   performing an operation based on the instruction.

9. The method of claim 7, further comprising:
   receiving an instruction from one of the remote computing device and a user after the result is communicated to the remote computing device; and
   performing an operation based on the instruction.

10. The method of claim 1, wherein the execution method returns an indication of one of a test success and a test failure.

11. The method of claim 1, wherein the at least one local test comprises at least one of:
    a heap memory test for determining an available and usable amount of heap memory in the mobile terminal;
    a socket test for validating that a socket connection to a server can be opened from the mobile terminal;
    an HTTP test for ensuring that the mobile device can access a web content multiple times without causing an error in the mobile terminal;
    a record management system (RMS) test for determining a quantity of persistent memory available for use by application programs executed on the mobile terminal;
    an RMS integrity test for validating that data stored in the persistent memory does not get overwritten or corrupted and can be read back correctly;
    an image test for determining a speed at which the mobile device can render graphic images;
    a short message service (SMS) test for validating communication of SMS messages by the mobile terminal; and
    a camera test for validating control and operation of a camera built into the mobile device.

12. The method of claim 1, further comprising displaying the result of the at least one local test on a display of the mobile terminal.

13. The method of claim 1, wherein the mobile terminal comprises an emulation of a physical mobile terminal.

14. A client for testing a mobile terminal, comprising:
    a processor;
    a display in communication with the processor; and
    a memory in communication with the processor and storing data and machine instructions that at least in part cause the processor to perform the operations of:
       instantiating a test class that can perform at least one local test of a capability of the mobile terminal, wherein the test class implements a program interface specifying at least an execution method that is called to perform the at least one local test of the capability of the mobile terminal and a results method that returns a result for each performed local test;
       executing a user interface that enables a user to select the at least one local test from a plurality of local tests displayed on the display;
       automatically performing a preliminary check of the mobile terminal to detect whether the mobile terminal includes a component to be locally tested by at least one of the plurality of local tests;

deactivating the at least one of the plurality of local tests to prevent the instantiating of the at least one of the plurality of local tests if the performed preliminary check determines that the mobile terminal does not include the component to be locally tested by the one of the plurality of local tests; and executing the instantiation of the test class to perform the at least one local test of the capability of the mobile terminal by calling the execution method and the results method, if the instantiating of the at least one local test was not deactivated.

15. The client of claim 14, wherein the machine instructions further cause the processor to perform the operation of:

causing the user interface to call the execution method and the results method for the test class from a plurality of test classes to perform the at least one local test from the plurality of local tests.

16. The client of claim 15, wherein the machine instructions further cause the processor to perform the operation of displaying the result of the at least one local test on the display.

17. The client of claim 14, wherein the component is a hardware component.

18. The client of claim 15, wherein the machine instructions further cause the processor to perform the operation of causing the user interface to call at least one of the following:

a name method specified by the program interface to display an identity of the at least one local test; and a description method specified by the program interface to display a description of the at least one local test.

19. The client of claim 14, wherein the results method returns at least one of the following: a string and a table.

20. The client of claim 14, wherein the at least one local test comprises at least one of:

a heap memory test for determining an available and usable amount of heap memory in the mobile terminal;

a socket test for validating that a socket connection to a server can be opened from the mobile terminal;

an HTTP test for ensuring that the mobile device can access a web content multiple times without causing an error in the mobile terminal;

a record management system (RMS) test for determining a quantity of persistent memory available for use by application programs executed on the mobile terminal;

an RMS integrity test for validating that data stored in the persistent memory does not get overwritten or corrupted and can be read back correctly;

an image test for determining a speed at which the mobile device can render graphic images;

a short message service (SMS) test for validating communication of SMS messages by the mobile terminal; and a camera test for validating control and operation of a camera built into the mobile device.

21. The client of claim 14, further comprising a communication interface and the machine instructions further cause the processor to perform at least one of the following operations:

downloading the test class from a remote computing device; and communicating the result of the at least one local test on the mobile terminal to a remote computing device.

22. The client of claim 14, further comprising a communication interface and the machine instructions further cause the processor to perform at least one of the following operations:

receiving an additional instruction from one of a remote computing device and a user; and performing an operation based on the additional instruction.

23. The method of claim 14, further comprising a communication interface and the machine instructions further cause the processor to perform the following operations:

communicating the result of the at least one local test on the mobile terminal to a remote computing device;

receiving an additional instruction from one of the remote computing device and a user after the result is communicated to the remote computing device; and performing an operation based on the additional instruction.

24. The client of claim 14, wherein the system comprises one of:

the mobile terminal; and a computing device that emulates the mobile terminal.

25. A server for testing a mobile terminal comprising:

a communication interface;

a memory for storing instructions; and a processor in communication with the memory and the communication interface and for performing actions based at least in part on the stored instructions, including:

storing a test class that can perform at least one local test of a capability of the mobile terminal, wherein the test class implements a program interface specifying at least an execution method that is called to perform the at least one local test of the capability of the mobile terminal and a results method that returns a result for each performed local test;

automatically performing a preliminary check of the mobile terminal to detect whether the mobile terminal includes a component to be locally tested by the at least one local test;

deactivating the at least one local test to prevent instantiating of the at least one local test if the performed preliminary check determines that the mobile terminal does not include the component to be tested by the at least one local test; and communicating the test class to the mobile terminal.

26. The server of claim 25, where in the processor further performs the actions of:

storing a user interface that enables a user of the mobile terminal to select the at least one local test from a plurality of local tests displayed on a display of the mobile terminal, and wherein the user interface calls the execution method and the results method for the test class from a plurality of test classes to perform the at least one local test from the plurality of local tests; and communicating the user interface to the mobile terminal.

27. The server of claim 25, where in the processor further performs the actions of:

receiving the result of the at least one local test from the mobile terminal; and communicating an additional instruction to the mobile terminal that causes the mobile terminal to perform an operation based on the additional instruction.

28. A computer readable storage medium, comprising executable instructions for performing actions including:

instantiating a test class that can perform at least one local test of a capability of a mobile terminal, wherein the test class implements a program interface specifying at least an execution method that is called to perform the at least one local test of the capability of the mobile terminal and a results method that returns a result for each performed local test;

automatically performing a preliminary check of the mobile terminal to detect whether the mobile terminal includes a component to be locally tested by the at least one local test;

deactivating the at least one local test to prevent the instantiating of the at least one local test if the performed preliminary check determines that the mobile terminal does not include the component to be tested by the at least one local test; and executing the instantiation of the test class to perform the at least one local test of the capability of the mobile terminal by calling the execution method and the results method, if the instantiating of the at least one local test was not deactivated.

29. A network for communicating content over a network, the network communicating a test class to a mobile terminal wherein the test class can perform at least one local test of a capability of the mobile terminal, and wherein the test class implements a program interface specifying at least an execution method that is called to perform the at least one local test of the capability of the mobile terminal, a results method that is called to return a result for each performed local test, a detection method that is called to automatically perform a preliminary check of the mobile terminal to detect whether the mobile terminal includes a component to be locally tested by the at least one local test, and a deactivation method that is called to deactivate the at least one local test to prevent instantiating of the at least one local test if the performed preliminary check determines that the mobile terminal does not include the component.

30. A method for testing a mobile terminal, comprising:

instantiating a test class that implements a program interface specifying at least a computer executable detection method that is called to automatically perform a preliminary check of the mobile terminal to detect whether the mobile terminal includes a component associated with at least one local test, a computer executable deactivation method that is called to deactivate the at least one local test to prevent the instantiating of the at least one local test if the performed preliminary check determines that the mobile terminal does not include the component, a computer executable execution method that is called to perform the at least one local test of the mobile terminal and a computer executable results method that is called to return a result for each performed local test, and that can access a video control object of the mobile terminal;

instructing the video control object to capture image data with a camera of the mobile terminal, by calling the execution method, if the detection method detects that the mobile terminal includes the camera;

determining with the called execution method whether image data was stored in an image memory after instructing the video control object to capture the image data; and reporting that a local camera test was successful if image data was stored in the image memory, by calling the results method.

* * * * *

UNITED STATES PATENT AND TRADEMARK OFFICE
CERTIFICATE OF CORRECTION

| | | |
|---|---|---|
| PATENT NO. | : 7,630,708 B2 | Page 1 of 1 |
| APPLICATION NO. | : 11/077921 | |
| DATED | : December 8, 2009 | |
| INVENTOR(S) | : Albert K. So et al. | |

It is certified that error appears in the above-identified patent and that said Letters Patent is hereby corrected as shown below:

On Title page, in field 75, in column 1, in "Inventors", line 1, after "Albert" insert -- K. --.

In column 3, line 35, delete "non-rechatgeable" and insert -- non-rechargeable --, therefor.

In column 3, line 54, delete "internet" and insert -- Internet --, therefor.

In column 12, line 42, in claim 26, delete "where in" and insert -- wherein --, therefor.

In column 12, line 52, in claim 27, delete "where in" and insert -- wherein --, therefor.

Signed and Sealed this

Sixteenth Day of February, 2010

David J. Kappos
*Director of the United States Patent and Trademark Office*